United States Patent [19]
Johnson

[11] 3,921,351
[45] Nov. 25, 1975

[54] SEGMENTED STORAGE BIN

[75] Inventor: Walter E. Johnson, Wayne, N.J.

[73] Assignee: H. F. Henderson Industries, West Caldwell, N.J.

[22] Filed: Dec. 20, 1973

[21] Appl. No.: 426,583

[52] U.S. Cl. .................. 52/197; 52/192; 214/17 R; 222/462
[51] Int. Cl.² .............. B65D 87/00; B67C 11/00; B65B 39/04
[58] Field of Search .................. 52/192–197; 222/460, 462; 214/17 R

[56] References Cited
UNITED STATES PATENTS

| 1,465,745 | 8/1923 | Strong | 52/197 X |
| 2,104,896 | 1/1938 | Clerer | 52/197 |
| 2,563,470 | 8/1951 | Kane | 52/197 X |
| 2,719,206 | 9/1955 | Gilmore | 214/17 X |
| 2,943,752 | 7/1960 | Platt | 52/197 X |
| 3,010,620 | 11/1961 | Folse | 52/197 X |
| 3,165,304 | 1/1965 | Tvergaard et al. | 52/197 X |
| 3,583,769 | 6/1971 | Mundinger | 222/460 X |
| 3,593,892 | 7/1971 | Petit | 52/197 X |
| 3,797,707 | 3/1974 | Jenike | 222/462 |

FOREIGN PATENTS OR APPLICATIONS

| 1,114,147 | 9/1961 | Germany | 214/17 R |
| 555,940 | 2/1957 | Italy | 52/194 |
| 65,543 | 2/1969 | Germany | 214/17 R |
| 791,033 | 6/1935 | France | 52/197 |
| 169,988 | 3/1933 | Switzerland | 52/197 |
| 685,371 | 1/1953 | United Kingdom | |

Primary Examiner—Ernest R. Purser
Assistant Examiner—Leslie A. Braun
Attorney, Agent, or Firm—Fidelman, Wolffe & Leitner

[57] ABSTRACT

A segmented storage bin for storing and dispensing particulate material comprises a first bin segment having a hollow body portion with a closed cross-section, an orifice at the bottom of the hollow body portion and an opening at the top of the hollow body portion. The bin further comprises a second bin segment positioned above the first bin segment and securely fastened to it. The second bin segment also has a hollow body portion with a closed cross-section, and an orifice at the bottom of this hollow body portion. The orifice at the bottom of the second bin segment is smaller than the opening at the top of the first bin segment to thereby permit the free flow of the pulverized material from the second bin segment into the first bin segment.

7 Claims, 5 Drawing Figures 3,921,351

SEGMENTED STORAGE BIN

BACKGROUND OF THE INVENTION

The present invention relates generally to an apparatus for storing and dispensing particulate material and more particularly to a segmented storage bin for storing and dispensing particulate material in such a manner as to overcome many of the problems inherent in prior art devices.

One of the critical problems in the design of bulk material storage bins is the elimination of flow restrictions and stoppages, which prevent finely pulverized materials from flowing freely out of the bin. Use of improper design criteria has caused the stored material to plug up the bin outlet or, in some cases, to create a bridge between the bin walls. In other instances, a phenomenon known as "rat holing" has occurred wherein the stored material adheres to the bin walls and flows only in a narrow channel through the center of the bin, thus greatly reducing the useful storage capacity of the bin. Furthermore, as the material being stored becomes more finely pulverized, the above problems become even more critical.

To overcome these problems, prior storage bins have utilized mechanical vibrators, air piping, and padding on the bin walls in order to stimulate flow. For example, U.S. Pat. No. 3,593,892 shows a silo which utilizes both a central chimney and a vibratable hopper to aid the flow of stored material. U.S. Pat. No. 3,278,081 shows a hopper apparatus with a complex vibrating mechanism to avoid the clogging or bridging of particulate material contained therein. Such prior art flow inducing measures, in addition to greatly adding to the cost of the bin, also reduce or limit the storage capacity of the bin.

Accordingly, it is an object of the present invention to overcome the deficiencies of prior storage bins by providing a novel storage bin that will permit the free flow of all material within the bin so as to enable the complete discharge of all material within the bin.

Another object of the present invention is the provision of a novel storage bin which will provide the maximum storage capacity consistent with principles of free flow.

Yet another object of the present invention is the provision of a novel storage bin that will permit the free flow of all material within the bin without the use of any flow inducing devices.

A further object of the present invention is the provision of a novel storage bin which can overcome the deficiencies present in prior bins while being adapted to store and dispense a wide variety of particulate material.

A still further object of the present invention is the provision of a novel storage bin which is relatively simple in construction and therefore easy to manufacture.

SUMMARY OF THE INVENTION

The present invention provides a segmented storage bin for storing and dispensing particulate material. The storage bin comprises a first bin segment having a hollow body portion with a closed cross-section, an orifice at the bottom of the hollow body portion, and an opening at the top of the hollow body portion. The bin further comprises a second bin segment positioned above the first bin segment and securely fastened to it. The second bin segment also has a hollow body portion with a closed cross-section, and an orifice at the bottom of this hollow body portion. The orifice at the bottom of the second bin segment is smaller than the opening at the top of the first bin segment, to thereby permit the free flow of the pulverized material from the second bin segment into the first bin segment. Further in accord with the present invention, the height of each bin segment is limited to no more than 3.5 times the minimum dimension of the orifice located at the bottom of that bin segment.

Other objects, advantages and novel features of the present invention will become apparent from the following detailed description of the invention when considered in conjunction with the accompanying drawings.

DETAILED DESCRIPTION OF THE DRAWINGS

Figure 1:
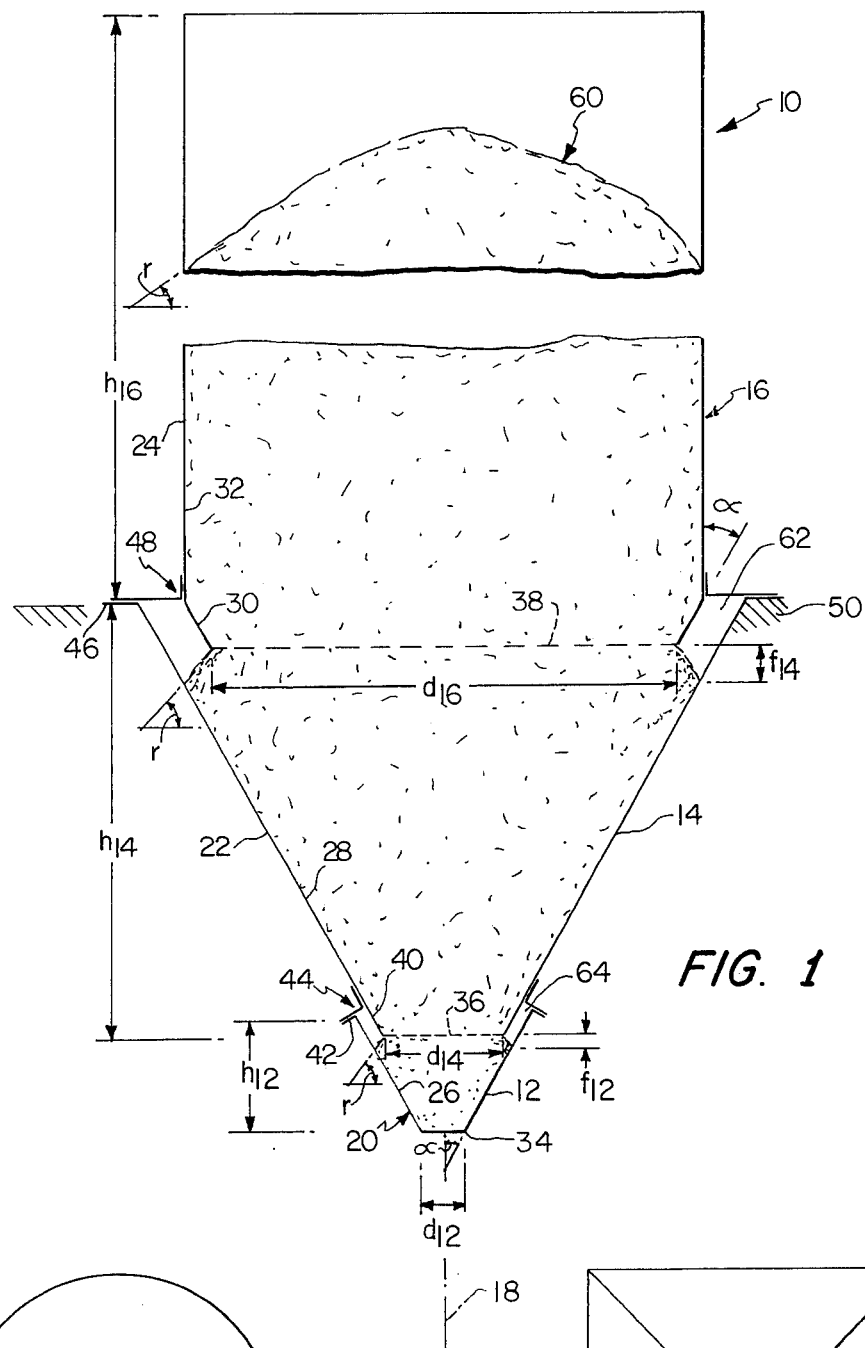
Figure 3:
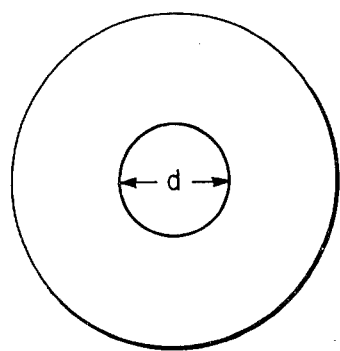
Figure 4:
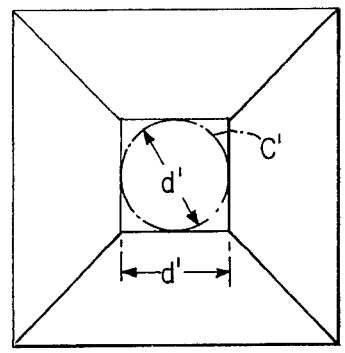
Figure 2:
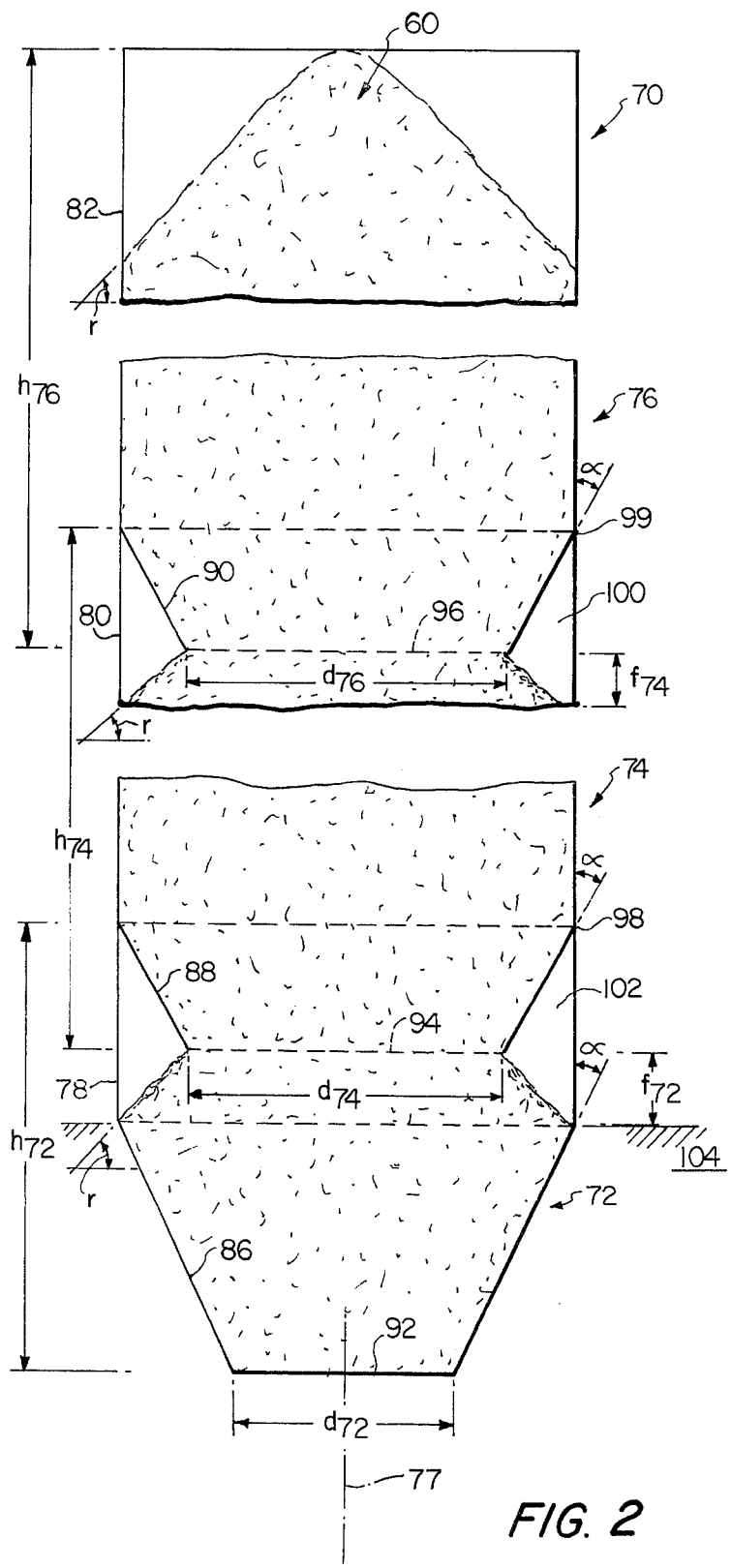
Figure 5:
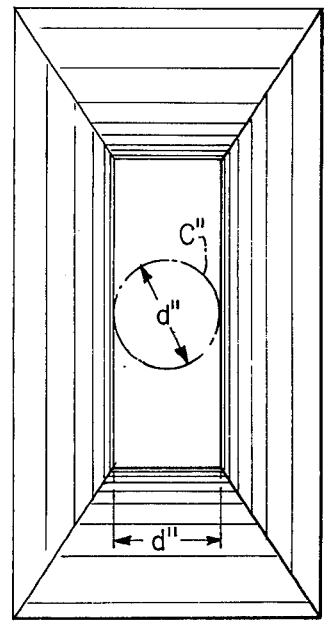

FIG. 1 schematically shows a cross-sectional view of one embodiment of the storage bin of the present invention;

FIG. 2 schematically shows a cross-sectional view of a second embodiment of the storage bin of the present invention;

FIGS. 3, 4 and 5 show examples of possible shapes for the individual bin segments shown in FIGS. 1 and 2.

DESCRIPTION OF THE PREFERRED EMBODIMENTS

FIG. 1 illustrates a preferred embodiment of the segmented storage bin of the present invention and shows a storage bin 10 having three bin segments, 12, 14 and 16, centered about a vertical axis 18. The bin segments 12, 14 and 16 have hollow body portions 20, 22 and 24, respectively. The hollow body portions 20, 22 and 24 may be of any useful cross-sectional configuration. For example, body portions of circular, square and rectangular configurations are shown in FIGS. 3, 4 and 5, respectively.

The hollow body portions 20 and 22 include sidewalls 26 and 28, respectively, sloped at an angle $\alpha$ with respect to the vertical axis 18. Hollow body portion 24 includes a side-wall portion 30 also sloped at an angle $\alpha$ with respect to the vertical axis 18, and further includes a vertical side-wall portion 32. Located at the bottom of each of the hollow body portions 20, 22 and 24 are orifices 34, 36 and 38, respectively. The orifices 34, 36 and 38 have minimum dimensions $d_{12}$, $d_{14}$, and $d_{16}$, respectively, which are equal to the diameter of the largest circle that can be inscribed within the respective orifice. For example, the minimum dimension $d$ of a circular orifice (such as that illustrated in FIG. 3) is merely the diameter of that orifice. The minimum dimension $d'$ of a square orifice, such as that illustrated in FIG. 4, is merely the diameter of the circle $C'$ inscribed within that orifice. The minimum dimensions $d''$ of a rectangular orifice, such as that illustrated in FIG. 5, is the diameter of the inscribed circle $C''$. The hollow body portions 20, 22 and 24 are preferably made of steel, but may be made of any material of suitable strength. Each of the hollow body portions 20, 22 and 24, is open at the top to permit the vertical stacking of the bin segments 12, 14 and 16, respectively, about vertical axis 18. Thus, a portion 40 of body portion 22, including orifice 36, is nested within body portion 20. Likewise, a portion 30 of body portion 24, including orifice 38, is nested within body portion 22. The bin segment 12 includes a flange portion 42 extending outwardly from the wall portion 26. A joining member 44 having an L-shaped cross-section is suitably fastened, such as by welding, to the flange 42 and also to the wall portion 28 of body portion 22 to thereby securely fasten bin segment 12 to bin segment 14. Similarly, bin segment 14 includes a flange portion 46 extending outwardly from wall portion 28. A joining member 48 having an L-shaped cross-section is suitably fastened, such as by welding, to the flange portion 46 and to the wall portion 32 of body portion 24, to thereby securely fasten bin segment 16 to bin segment 14. The vertical heights of the bin segments 12, 14 and 16 are designated as $h_{12}$, $h_{14}$, and $h_{16}$, respectively. The storage bin 10 may be supported by any known means as schematically illustrated at 50.

Particulate material 60 is loaded into the top bin segment 16 of the segmented storage bin 10. The segmented storage bin of the present invention is particularly useful for those materials below 200 mesh screen size. Examples of such materials are finely pulverized powders, chemicals, pigments, accelerators, flour, and cement. However, the segmented storage bin of the present invention is equally useful in storing coarse materials even above 100 mesh screen size. The particulate material 60 is free to flow through bin segment 16 and down through orifice 38. It is important to note here that orifice 38 is substantially smaller than the opening at the top of bin segment 14. Thus, a free flow area $f_{14}$ is created between bin segments 16 and 14, and the particulate material 16 is free to flow from bin segment 16 into bin segment 14. Again, because the orifice 38 is smaller than the opening at the top of bin segment 14 and also because the bin segment 16 is partially nested within the top of bin segment 14, a de-aerating chamber 62 is created. The de-aerating chamber 62 is bound on its sides by wall portion 30 of bin segment 16 and by wall portion 28 of bin segment 14, at its top by L-shaped member 48, and on its bottom by the flowing or stored material 60.

The existance of the de-aerating chamber 62 permits the escape of unwanted gases that may be trapped within the particulate material 60. Should further de-aeration prove necessary, it is possible to provide venting along wall 28 in the area of the de-aeration chamber 62. The particulate material 60 is then free to flow through bin section 14 and out through the orifice 36 located at the bottom thereof. Since the orifice 36 is smaller than the opening at the top of bin segment 12, a free-flow area $f_{12}$ is created between bin segments 14 and 12. Likewise, since bin segment 14 is partially nested within bin segment 12, a de-aeration chamber 64 is created between bin segment 14 and bin segment 12. The deaeration chamber 64 is bound on its sides by wall portion 40 of bin segment 14 and wall portion 26 of bin segment 12, at its top by joining member 44 and on its bottom by the flowing or stored material 60. Once again, should further venting prove necessary, vents may be provided in the wall portion 26 of bin segment 12 in the area of the de-aeration chamber 64. The particulate material 60 is now free to flow through bin segment 12 and out through orifice 34 located at the bottom of bin segment 12.

The design criteria employed in determining the specific dimensions of a segmented storage bin such as that illustrated in FIG. 1 will now be discussed. Every type of particulate material, when deposited on a horizontal surface, will tend to pile up at a particular angle of repose r with respect to that horizontal surface. Once the material to be stored is known, and thus the angle of repose for such material is known, the orifice located at the bottom of the bottom-most bin segment, for example, bin segment 12 in FIG. 1, can then be determined. The size of this orifice will be determined by the rate of flow at which one wishes to dispense the particulate material to be stored. However, a minimum acceptable orifice size can be determined by applying the following formula:

$$d = \frac{\left(\frac{1}{3}\right)r}{D} \quad (1)$$

where
$d$ = minimum orifice dimensions in feet
$r$ = angle of repose of the stored material in degrees
$D$ = density in lbs/ft³ of the stored material
The height of each bin segment can be determined by the following relationship:

$$h \leq 3.5\, d \quad (2)$$

where
$h$ = height of a bin segment in feet
$d$ = minimum orifice dimension of that bin, segmented in feet
The side slope of the bin walls can be determined as follows:

$$\alpha \leq (90° - r) - 15° \quad (3)$$

where
$\alpha$ = angle of bin wall slope in degrees
$r$ = angle of respose of the stored material, in degrees
The orifice sizes for bin segments stacked vertically above the bottom segment should never have a minimum dimension smaller than the minimum orifice as determined in formula one. The maximum dimension for such orifices will generally be determined by storage requirements; however, such orifices must always be sufficiently smaller than the opening of the bin segment into which they are recessed to create a free-flow area which is not less than 5 percent of the height of the bin segment into which they are recessed.

Referring now specifically to the segmented storage bin depicted in FIG. 1, a specific example of the design of the dimensions of such a bin will be given:
$r = 45°$
$D = 40$ lbs/ft³

$$d_{12} = \frac{\left(\frac{1}{3}\right)(45)}{40} = 0.375 \text{ ft}$$

In any case, because of dispensing requirements, $d$ is determined to be 2 feet.
$h_{12}$ (max) $\leq 3.5$ (2 ft) $\leq 7$ ft
$\alpha \leq (90° - 45°) - 15° \leq 30°$
$d_{14} = 8$ ft so that $f_{12} = 1$ ft
$h_{14}$ (max) $\leq 3.5$ (8 ft) $\leq 28$ ft $d_{16} = 34$ ft so that $f_{14} = 4$ ft $h_{16}$ (max.) $\leq 3.5 (34) \leq 119$ ft It should be understood that depending upon storage requirements, the side-wall portion 32 of uppermost bin segment 16 could be sloped. Also, dependent upon storage requirements, additional bin segments totalling 6 or even more could be utilized in accordance with the present invention.

FIG. 2 illustrates an alternate embodiment of the present invention wherein a segmented storage bin, generally indicated at 70, includes individual bin segments 72, 74 and 76, respectively, centered about a vertical axis 77. Each of the bin segments 72, 74 and 76 has a hollow body portion 78, 80 and 82, respectively; the side walls of which are substantially vertical. However, the lower portions of the wide walls of hollow body portions 78, 80 and 82 are sloped with respect to the vertical axis 77 at an angle $\alpha$, creating sloped wall portions 86, 88 and 90, respectively. The sloped wall portions 86, 88 and 90 terminate in orifices 92, 94 and 96, respectively. This embodiment differs from the embodiment of the storage bin shown in FIG. 1 in that, since the side walls of the bin segments are substantially vertical, when the bin segments are nested one within the other, the sidewall portions align vertically. As a result, in order to permanently secure a bin segment to the bin segment located immediately below it, it is merely necessary to weld these segments together at the point where they join. These welds are accomplished along seams 98 and 99. Thus, when particulate material 60 is loaded into the upper bin segments 76, it will flow down through orifice 96 and into a free flow area $f_{14}$. A de-aeration chamber 100 is created between side-wall portion 90 of bin segment 76, hollow body portion 80 of bin segment 74, and the stored material 60. The material 60 will continue to flow through orifice 94 of bin segment 74 into a free-flow area $f_{12}$. Similarly, a de-aerating chamber 102 is formed between side-wall portion 88 of the segment 74, hollow body portion 78 of bin segment 72 and the stored material 60. the material 60 is then free to flow through orifice 92 at the bottom of bin segment 72. The segmented storage bin 70 may be supported by any known means, such as that schematically illustrated at 104. The dimensions of the segmented storage bin 70 can be determined by formulas one, two and three, as previously explained. While segmented storage bin 70 is simpler in construction than segmented storage bin 10, since no fastening members are required, it is useful only where storage requirements permit. However, this type of construction is useful once a desired bin width has been reached. For example, in FIG. 1, should any further bins be added on top of bin segment 16, they could be fastened in the manner shown in FIG. 2. As in the case of segmented storage bin 10 in FIG. 1, segmented storage bin 70 may take on a variety of cross-sectional configurations, such as those illustrated in FIGS. 3, 4, and 5.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A segmented storage bin for storing and dispensing a particulate material comprising:
   a. a first bin segment containing said particulate material, comprising a first hollow body portion having a closed cross-section, a first orifice at the bottom of said first hollow body portion, and a first opening at the top of said first body portion; and
   b. a second bin segment containing said particulate material, positioned above said first bin segment and securely fastened to said first bin segment, comprising a second hollow body portion having a closed cross-section, and a second orifice at the bottom of said second hollow body portion, said second orifice being smaller than said first opening to thereby permit the free flow of said particulate material from said second bin segment into said first bin segment; wherein said first orifice has a minimum dimension $d_1$, which is equal to the diameter of the largest circle that can be inscribed in said first orifice and which, measured in feet, is no less than one-third the angle of repose of said particulate material measured in degrees, divided by the density of said particulate material, measured in pounds per cubic foot and wherein said second bin segment is partially nested within said first bin segment so that a de-aerating chamber is created between the outside of said second body portion and the inside of said first body portion to thereby permit gases trapped within said particulate material to escape into said de-aerating chamber.

2. A segmented storage bin as set forth in claim 1 wherein the height of said first bin segment is no more than 3.5 times $d_1$.

3. A segmented storage bin as set forth in claim 1 wherein said second orifice has a minimum dimension $d_2$, which is equal to the diameter of the largest circle that can be inscribed in said second orifice and which, measured in feet, is no less than one-third the angle of repose of said particulate material measured in degrees, divided by the density of said particulate material, measured in pounds per cubic foot.

4. A segmented storage bin as set forth in claim 3 wherein the height of said second bin segment is no more than 3.5 times $d_2$.

5. A segmented storage bin as set forth in claim 1 wherein said first and second bin segments are centered about a vertical axis and said first and second hollow body portions include side walls having portions thereof sloped at an angle with respect to said vertical axis, said angle of slope being less than the complement of the angle of repose of said particulate material.

6. A segmented storage bin as set forth in claim 5 wherein said angle of slope is at least 15° less than the complement of said angle of repose.

7. A segmented storage bin for storing and dispersing particulate material comprising:
   a. a plurality of bin segments vertically stacked, each bin segment being securely fastened to any vertically adjacent bin segment, and having a hollow body portion with a closed cross-section and an opening at the top of each body portion, wherein one bin segment is partially nested within the bin segment located immediately below said one bin segment so that a de-aerating chamber is created between the outside of the body portion of said one bin segment and the inside of the body portion of the bin segment located immediately below said one bin segment, to thereby permit gases trapped within said pulverized material to escape into said de-aerating chamber; and b. means between adjacent bin segments for establishing the free flow of said particulate material from one bin segment to the bin segment located immediately below said one bin segment, wherein said means comprises an orifice located at the bottom of each bin segment, each orifice having a minimum dimension equal to the diameter of the largest circle that can be inscribed therein, the height of each bin segment being no more than 3.5 times the minimum dimension of the orifice located at the bottom of that bin segment.

* * * * *